(12) United States Patent
Michioka et al.

(10) Patent No.: US 7,980,763 B2
(45) Date of Patent: Jul. 19, 2011

(54) MOTION GUIDE DEVICE

(75) Inventors: Hidekazu Michioka, Tokyo (JP);
Hiroaki Mochizuki, Tokyo (JP);
Takashi Sakuyama, Tokyo (JP)

(73) Assignee: THK Co., Ltd., Tokyo (JP)

( * ) Notice: Subject to any disclaimer, the term of this patent is extended or adjusted under 35 U.S.C. 154(b) by 872 days.

(21) Appl. No.: 11/660,960

(22) PCT Filed: Aug. 25, 2005

(86) PCT No.: PCT/JP2005/015412
§ 371 (c)(1),
(2), (4) Date: Dec. 5, 2007

(87) PCT Pub. No.: WO2006/022321
PCT Pub. Date: Mar. 2, 2006

(65) Prior Publication Data
US 2008/0212905 A1   Sep. 4, 2008

(30) Foreign Application Priority Data

Aug. 26, 2004   (JP) .................................. 2004-246524

(51) Int. Cl.
*F16C 33/00* (2006.01)
(52) U.S. Cl. .......................................... 384/43; 384/45
(58) Field of Classification Search .................... 384/15, 384/43, 44, 45
See application file for complete search history.

(56) References Cited

U.S. PATENT DOCUMENTS

| | | | |
|---|---|---|---|
| 4,749,284 A | 6/1988 | Teramachi | |
| 6,685,354 B2 * | 2/2004 | Michioka et al. | 384/45 |
| 6,783,278 B2 * | 8/2004 | Tsukada et al. | 384/45 |

FOREIGN PATENT DOCUMENTS

| | | |
|---|---|---|
| JP | 61-274118 A | 12/1986 |
| JP | 2-89810 A | 3/1990 |
| JP | 07-208467 | 8/1995 |
| JP | 8-114223 A | 5/1996 |
| JP | 2004-68880 A | 3/2004 |

OTHER PUBLICATIONS

European search report dated Dec. 16, 2008 issued in corresponding European Application No. 05780936.0. International Search Report of PCT/JP2005/015412, date of mailing Dec. 20, 2005.
International Preliminary Report on Patentability for PCT/JP2005/015412.

* cited by examiner

*Primary Examiner* — Richard Ridley
*Assistant Examiner* — James Pilkington
(74) *Attorney, Agent, or Firm* — Westerman, Hattori, Daniels & Adrian, LLP (57) ABSTRACT

A motion guide device having a novel scoop section structure whose scoop section is not likely to break even if a movement member is moved at high speed. A scoop section (22) of a movement block (12) scoops balls (13) that roll in a ball rolling groove (11a) of a raceway rail (11) and introduces them into no-load ball return paths (17, 20). The scoop section (22) is formed in a Gothic arch groove shape in which the scoop section (22) is in two-point contact with a ball (13). In a cross-section orthogonal to the advance direction of the balls (13), an angle (contact angle α) formed by a line L1 that connects a point P at which the scoop section (22) and a ball (13) are in contact and the center C of the ball (13) and a line L2 that connects the center of the ball (13) and a bottom (22a) of the Gothic arch groove-shaped scoop section (22) exceeds 30 degrees and is not more than an angle γ formed by a line L3 that connects the center C of the ball (13) rolling in the ball rolling groove (11a) of the raceway rail (11) and an edge (35) of the ball rolling groove (11a) of the raceway rail (11) and the line L2 that connects the center C of the ball (13) and the bottom of the ball rolling groove (11a).

5 Claims, 7 Drawing Sheets

RELATED ART

(A) contact starting point (B) 45° contact (41° at the time of collision)

RELATED ART

RELATED ART

FIG.11 ball traveling direction 1.5 x ball pitch

MOTION GUIDE DEVICE

TECHNICAL FIELD

The present invention relates to a motion guide device, such as a linear guide or a ball spline in which a moving member moves relative to a raceway member. Particularly, the present invention relates to a motion guide device in which a ball that rolls in a ball rolling groove of a raceway member is scooped by a scoop section of a moving member so as to be introduced into a no-load ball return path.

BACKGROUND ART

A linear guide, one type of a motion guide device, is provided with a raceway rail in which a plurality of ball rolling grooves are formed, extending parallel to each other, and a saddle-shaped moving block which is assembled so as to be slidably movable along the raceway rail through a number of rolling bodies, such as balls. The moving block is formed with a plurality of load ball rolling grooves opposed to the ball rolling grooves in the raceway rail, and no-load ball return paths each of which connects one end of the load ball rolling groove and the other end of the load ball rolling groove.

A pair of end plates is attached to both ends of the moving block in its moving direction. Each of the balls that rolls in the ball rolling groove in the raceway rail is scooped from the ball rolling groove by the scoop section at a lower end of the end plate for entry into the non-load ball return path. The ball that has circulated through the non-load ball return path again enters a load ball rolling path (defined between the ball rolling groove in the raceway rail and the load ball rolling groove in the moving block), being pushed by the balls that follow.

In such a linear guide, it has been that the scoop section at the lower end of the end plate is likely to be damaged when the moving block is attempted to be moved at high speed (e.g., 150 m/min or more). As a motion guide device for resolving this problem, one described in the following Patent Document 1 is known, in which the scoop section is unlikely to be damaged with high-speed movement.

Patent Document 1: Japanese Patent Laid-Open No. 2004-068880

DISCLOSURE OF THE INVENTION

Problems to be Solved by the Invention

Damages at the scoop section are caused when each ball is discharged from the end plate for entry into the load ball rolling path, and when each ball is discharged from the load ball rolling path for entry into the end plate.

Figure 13:
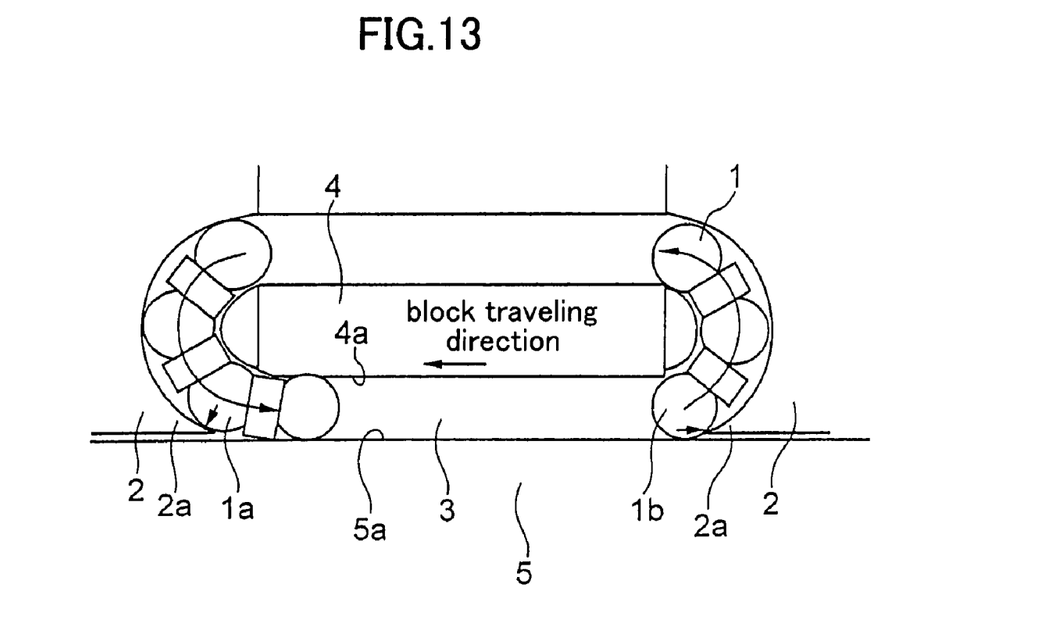
FIG. 13 illustrates a state where the ball is discharged from the end plate and enters a load ball rolling path, and a state where the ball is discharged from the load ball rolling path and enters the end plate.

FIG. 13 illustrates a state where a ball 1 is discharged from an end plate 2 and enters a load ball rolling path 3, and a state where the ball 1 is discharged from the load ball rolling path 3 and enters the end plate 2. When the ball 1 is discharged from the end plate 2 and enters the load ball rolling path 3, the ball 1 is deformed, being compressed between a ball rolling groove 5a of a raceway rail 5 and a load ball rolling groove 4a of a moving block 4. Higher moving speed of the ball 1 will make the entry of the ball 1 into the load ball rolling path 3 more difficult. As a result, the following pushing balls are zigzagged so that a ball 1a proximate to a scoop section is pushed outward. This ball 1a, which is pushed outside, has been the potential cause of deformation of and thus damages on a scoop portion 2a.

On the other hand, when the ball 1 is discharged from the load ball rolling path 3 and enters the end plate 2, a ball 1b that has been discharged from the load ball rolling path 3 collides, at high speed, against the scoop section 2a. This again has been the potential cause of plastic deformation of and thus damages on the scoop portion 2a.

The present invention has an object of providing a motion guide device having an improved scoop section structure which barely induces damage thereto when a moving member is moved at high speed.

Means for Solving the Problem

A description on the present invention will now be given hereunder. For clarity, the reference numerals in the accompanying drawings are indicated herein with bracketed numerals which, however, are not intended to limit the present invention to the forms illustrated in the drawings.

In order to resolve the problem described above, a first aspect provides a motion guide device including: a raceway member (11) in which ball rolling grooves (11a) are formed; a moving member (12) formed with load ball rolling grooves (14a) facing the ball rolling grooves (11a) and having non-load ball return paths (17) each connecting one end and the other end of each of the load ball rolling grooves (14a); and a plurality of balls (13) which are arranged in load ball rolling paths each defined between the ball rolling groove (11a) of the raceway member (11) and the load ball rolling groove (14a) of the moving member (12) and in the non-load ball return paths (17), the device scooping the balls (13) rolling in the ball rolling grooves (11a) of the raceway member (11) with the aid of the scoop section (22) of the moving member (12) for introduction into the non-load ball return paths (17), characterized in that: the scoop section (22) is formed into a shape of a Gothic arch groove for two-point contact with the ball (13); and in a cross-section perpendicular to a traveling direction of the balls (13), an angle (contact angle α) made between a line (L1) connecting a point (P) where the scoop section (22) contacts the ball (13) to a center (C) of the ball (13) and a line (L2) connecting the center (C) of the ball (13) to a bottom (22a) of the scoop section (22) of the Gothic arch groove is more than 30°, and equal to or less than an angle (γ) made between a line (L3) connecting the center (C) of the ball (13) that rolls in the ball rolling grooves (11a) of the raceway member (11) to an edge (35) of the ball rolling groove (11a) in the raceway member (11) and the line (L2) connecting the center (C) of the ball (13) to a bottom of the ball rolling groove (11a) in the raceway member (11).

A second aspect is characterized in that the invention provides the motion guide device, wherein the contact angle (α) is equal to or more than 40° and equal to or less than 60°.

A third aspect is characterized in that the invention provides the motion guide device, wherein, in a cross-section along the traveling direction of the balls (13), an arc surface is formed at a contact starting position where the ball (13) starts contacting the scoop section (22) when the scoop section (22) scoops the ball (13) that rolls in the ball rolling groove (11a) of the raceway member (11).

A fourth aspect is characterized in that the invention provides the motion guide device, wherein the moving member (12) includes: a moving block body (14) which is formed with the load ball rolling grooves (14a) and ball escape paths (17) each extending parallel to each of the load ball rolling grooves (14a) with a predetermined interval therebetween; and end plates (15) provided at both ends of the moving block body (14) in its traveling direction, in each of which an outer periphery of a direction changing path (21) connecting between the ball escape path (17) and the load ball rolling path (23) is formed for circulation of the balls (13), and wherein the scoop section (22) is provided at the end plate (15).

A fifth aspect is characterized in that the invention provides the motion guide device, wherein the outer periphery of the direction changing path (21) formed in the end plate (15) is structured circumferentially by a groove-shaped circular arc groove range (31) consisting of a single arc, a groove-shaped Gothic arch groove range (33) having two arcs for providing two contact points with the ball (13), and a groove transition range (32) provided between the circular arc groove range (31) and the Gothic arch groove range (33) to provide gradual change in the shape of the groove from the circular arc to the Gothic arch, and wherein the scoop section (22) is provided at an end of the Gothic arch groove range (33).

A sixth aspect provides a motion guide device including: a raceway member (11) in which ball rolling grooves (11a) are formed; a moving member (12) formed with load ball rolling grooves (14a) facing the ball rolling grooves (11a) and having non-load ball return paths (17) each connecting one end and the other end of each of the load ball rolling grooves (14a); and a plurality of balls (13) which are arranged in load ball rolling paths (23) each defined between the ball rolling groove (11a) of the raceway member (11) and the load ball rolling groove (14a) of the moving member (12) and in the non-load ball return paths (17), the device scooping the balls (13) rolling in the ball rolling grooves (11a) of the raceway member (11) with the aid of the scoop section (22) of the moving member (12) for introduction into the non-load ball return paths (17), characterized in that: the scoop section (22) is formed into a shape of a Gothic arch groove for two-point contact with the ball (13); and the ball contacts the scoop section (22) at two points when the scoop section (22) scoops the ball that rolls in the ball rolling groove (11a) of the raceway member (11) and the ball contacts the ball rolling groove (11a) at one point.

Effect of the Invention

According to the first aspect, owing to a larger contact angle, the contact starting position between the ball and the scoop section in scooping the ball can be backed off in the traveling direction of the ball and be placed upward. Thus, the thickness of the scoop section for the balls is increased and the strength is enhanced to allow for coping with high-speed movement. Also, since a front edge of the scoop section can be backed off, the scoop section can be shortened so as to mitigate the damage that would be suffered at the scoop section at high-speed movement. Further, since an upper limit of the contact angle is determined so that the scoop section is placed inside the ball rolling groove, the ball can be scooped even in a deep ball rolling groove.

As recited in the second aspect, the contact angle is preferably equal to or more than 40° and equal to or less than 60°.

A scoop angle becomes large with having the contact starting position between the ball and the scoop section backed off in the traveling direction of the ball. According to the third aspect, the formation of the arc surface at the contact starting position can mitigate the scoop angle.

As the fourth aspect, the scoop section of the present invention is suitable for the end plates of a linear guide.

According to the fifth aspect, the ball smoothly moves from the Gothic arch groove-shaped scoop section to the circular arc groove-shaped ball escape path (with circular cross section).

According to the sixth aspect, damages at the scoop section can be mitigated in high-speed movement.

DESCRIPTION OF SYMBOLS

11 . . . raceway rail (raceway member)
11a . . . ball rolling groove
12 . . . moving block (moving member)
13 . . . ball
14 . . . moving block body
14a . . . load ball rolling groove
15 . . . end plate
17 . . . ball escape path (no-load return path)
21, 21a and 21b . . . direction changing paths
22 . . . scoop section
22a . . . bottom of scoop section
22b . . . front edge
23 . . . load ball rolling path
31 . . . circular arc groove range
32 . . . groove transition range 33 . . . Gothic arch groove range
35 . . . edge

PREFERRED EMBODIMENTS OF THE INVENTION

Figure 1:
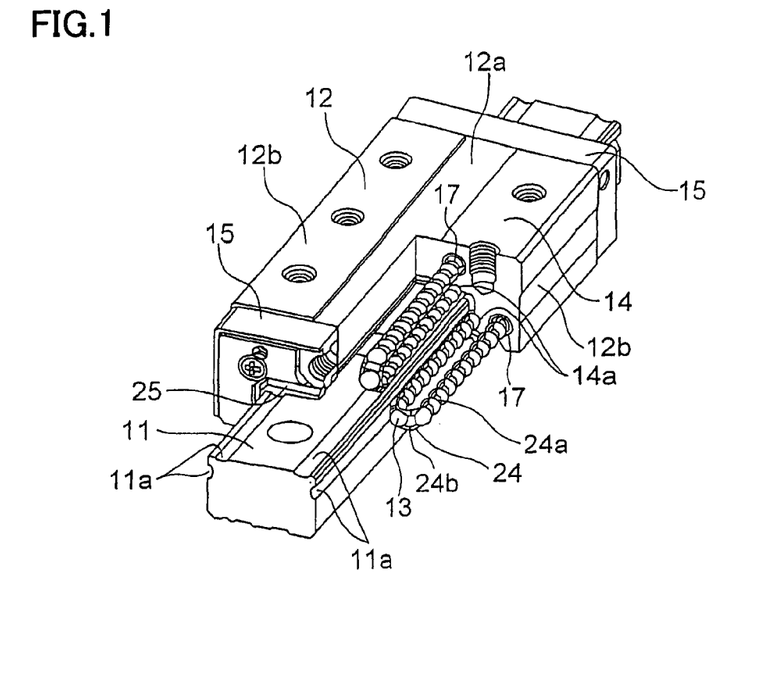
FIG. 1 is a perspective view of a linear guide as a motion guide device in one embodiment of the present invention.

FIG. 1 illustrates a linear guide as a motion guide device in an embodiment of the present invention. This linear guide is provided with an elongated raceway rail 11 extending linearly and serving a raceway member, and a saddle-shaped moving block 12 serving as a moving member, which is assembled so as to be slidably movable relative to the raceway rail 11. A number of balls 13 capable of rolling movement are intervened between the raceway rail 11 and the moving block 12.

The raceway rail 11 is formed to have a substantially rectangular cross-section, with a total of four ball rolling grooves 11a being formed in upper portions of left and right side faces and in opposed ends of an upper surface of the raceway rail 11. Each of the ball rolling grooves 11a extends in a longitudinal direction of the raceway rail 11 and formed into a circular arc grooved shape with its cross-section consisting of a single arc.

The moving block 12 is provided with a central portion 12a being opposed to the upper surface of the raceway rail 11, and side wall portions 12b, 12b, which extend downward from lateral sides of the central portion 12a so as to be opposed to the respective left and right side faces of the raceway rail 11. The entirety of the moving block 12 is formed into a shape of a saddle. The moving block 12 is provided with a steel moving block body 14 and a pair of end plates 15 which are mounted on lateral end faces of the moving block body 14 in its traveling direction.

A load ball rolling grooves 14a is formed in the moving block body 14 so as to face the ball rolling groove 11a of the raceway rail 11. The load ball rolling groove 14a is also formed into a circular arc grooved shape consisting of a single arc, totaling four in number so as to be opposed to each of the ball rolling grooves 11a of the raceway rail 11. The balls 13 roll and move between the ball rolling groove 11a of the raceway rail 11 and the load ball rolling groove 14a of the moving block body 14, being imposed with load.

In the moving block body 14, a ball escape path 17 made up of a through hole is formed extending parallel to each of the load ball rolling grooves 14a with a predetermined interval therebetween. The moving block body 14 is also integrally formed with an R-shaped piece 19, which connects between the load ball rolling groove 14a and the ball escape path 17 and constitutes an inner periphery of a U-shaped direction changing path 21 (refer to FIG. 6). In each of the end plates 15 attached to the lateral ends of the moving block body 14, an outer periphery 20 of the U-shaped direction changing path 21 is formed (refer to FIG. 6). As to the outer periphery 20 of the direction changing path 21 formed in the end plate 15 and the scoop section 22, a description will be provided later.

A no-load ball return path is structured by the ball escape path 17 of the moving block 12 and the direction changing path 21. A load ball rolling path 23 is formed between the ball rolling groove 11a of the raceway rail 11 and the load ball rolling groove 14a of the moving block body 14 (refer to FIG. 6). Thus, a ball circulation path having a shape of a track field is structured by the load ball rolling path 23, the direction changing path 21 and the ball escape path 17.

A large number of balls 13 are arranged in the load ball rolling path 23 and the non-load ball return paths 17. The large number of balls 13 are rotatably held in series in a ball retainer 24. The ball retainer 24 is provided with spacers 24a intervened between the balls 13, and a flexible belt 24b linking the spacers 24a. The plurality of balls 13 circulate through the ball circulation path without being in contact with each other, being held in the ball retainer 24.

An end seal 25 is attached to the inside of each of the end plates 15, 15. The end seal 25 prevents the entry of foreign materials and water attached to the surface and side faces of the raceway rail 11 into the moving block 12 and also prevents the leakage of lubricant in the moving block 12 to the outside.

Figure 2:
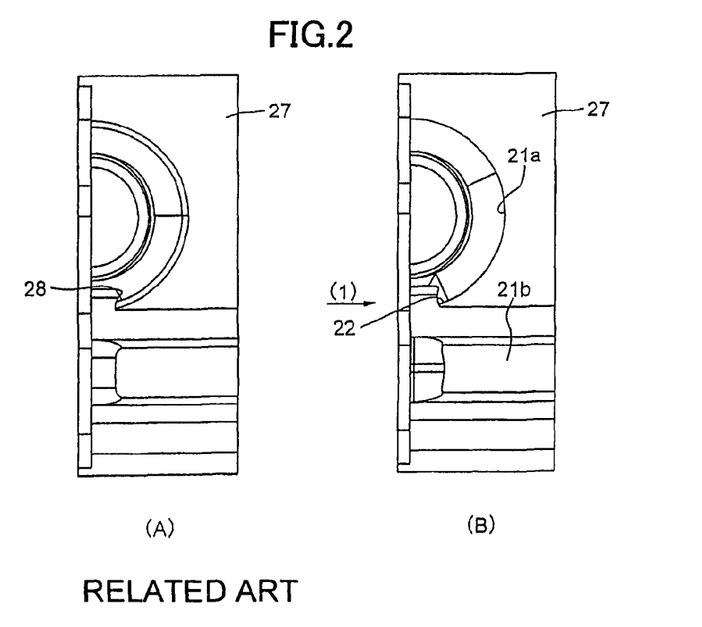
FIG. 2 illustrates, for comparison, cross-sections of a conventional end plate and an end plate according to the present embodiment ((A) representing the conventional end plate, and (B) representing the end plate according to the present embodiment)
Figure 3:
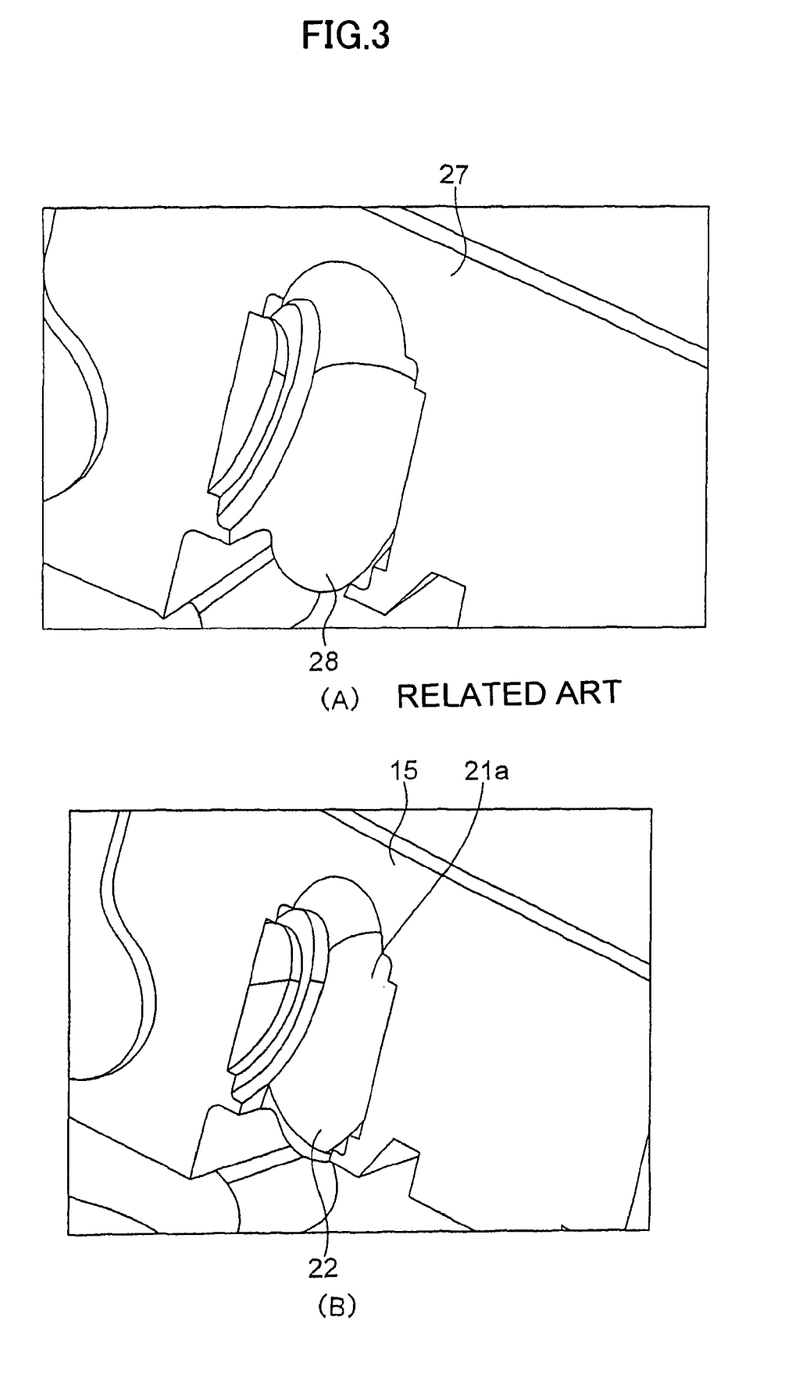
FIG. 3 perspectively illustrates, for comparison, a conventional end plate and an end plate according to the present embodiment ((A) representing the conventional end plate, and (B) representing the end plate according to the present embodiment)

FIGS. 2 and 3 each illustrate, for comparison, a conventional end plate 27 and the end plate 15 according to the present embodiment. FIG. 2 illustrates a direction changing path 21 (cross-sectionally shown) in the upper surface of the raceway rail 11 and a direction changing path 21b at the side face of the raceway rail 11. FIG. 3 perspectively illustrates the direction changing path 21a at the upper surface of the raceway rail 11, as viewed from the moving block body. In each of the figures, (A) represents the conventional end plate 27 and (B) represents the end plate 15 according to the present embodiment.

As shown in FIG. 2, the scoop section 22 is provided at a lower portion of the direction changing path 21a in the end plate 27, so that the balls 13 rolling in the ball rolling groove 11a of the raceway rail 11 can be scooped and directed to the direction changing path 21a. When the speed of the moving block 12 is low (e.g., equal to or less than 150 m/min), a scoop section 28 might not suffer from damages even with the conventional end plate 27. However, as the speed of the moving block 12 becomes high (e.g., equal to or more than 150 m/min), the conventional scoop section 28 is likely to be damaged. In order that the scoop section 22 may not suffer from damages with the high-speed movement of the moving block 12, a tip of the scoop section 22 in the present embodiment is backed off in a traveling direction (1) of the balls, comparing with the conventional scoop section.

Figure 4:
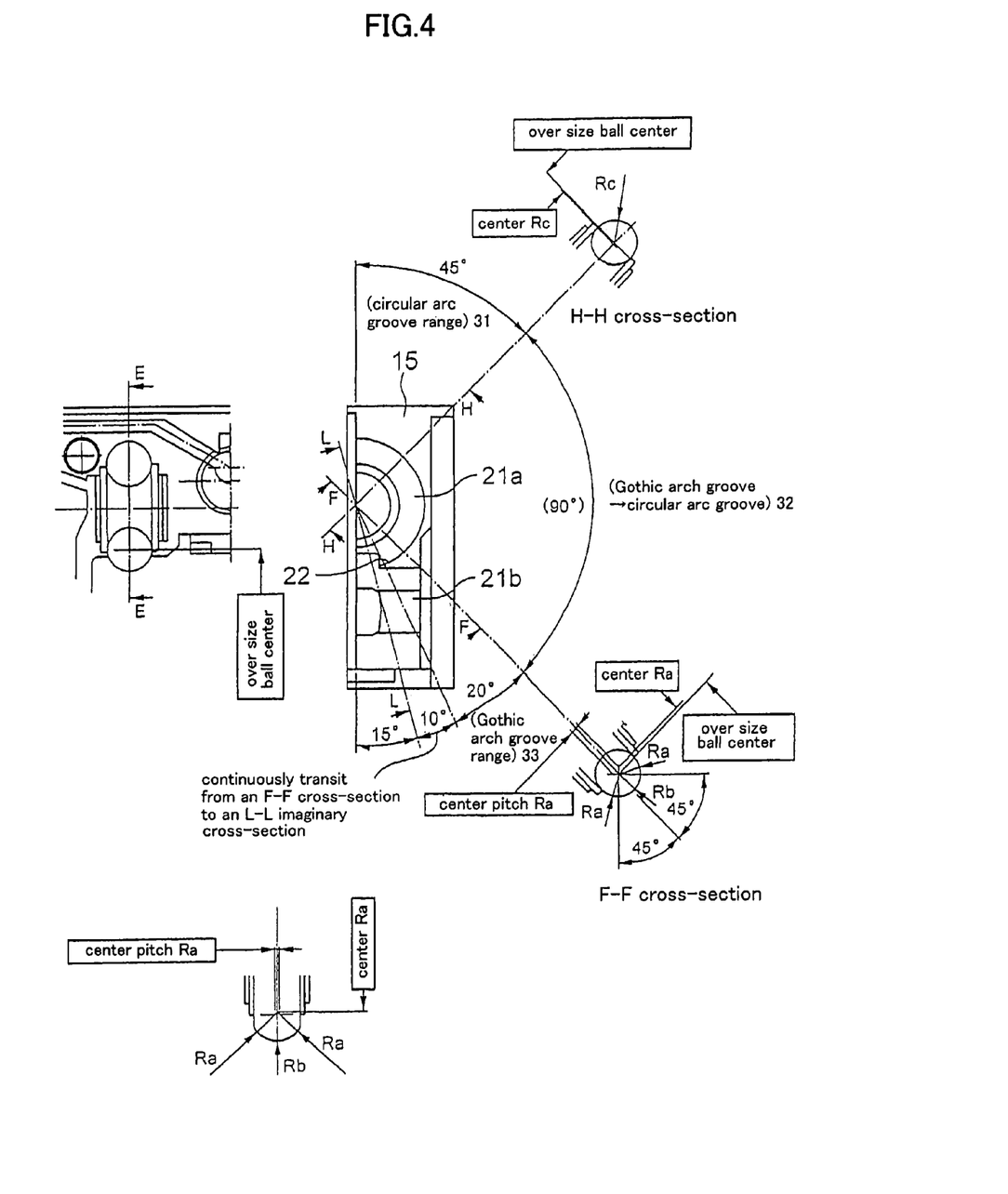
FIG. 4 illustrates an end plate in detail.

FIG. 4 illustrates the end plate 15 in detail. Although FIG. 4 illustrates the details of only the direction changing path 21a at the upper surface of the raceway rail 11, the direction changing path 21b at the side face of the raceway rail 11 also has the same structure. The outer periphery of the direction changing path 21a is formed in the end plate 15. The direction changing path 21a is structured circumferentially by a circular arc groove range 31 consisting of a single arc, a Gothic arch groove range 33 having two arcs to ensure contact with the ball 13 at two points, and a groove transition range 32 which is provided between the circular arc groove range 31 and the Gothic arch groove range 33 and provides gradual transition in the shape of the groove from the circular arc to the Gothic arch.

The circular arc groove range 31 is a range having a groove shape consisting of a single arc. The circular arc groove range 31 is formed within a 45-degree circumferential range, for example, of the direction changing path 21a. As shown by a cross-section taken along a line H-H in the figure, the circular arc groove has a shape with a single arc whose radius $R_c$ (a little larger than a radius of the ball) coincides with a radius of the ball escape path 17 of the moving block body 14.

The groove transition range 32 occupies a 90-degree circumferential range, for example, of the direction changing path 21a, in which the shape of the groove gradually changes from the Gothic arch to the circular arc.

The Gothic arch groove range 33 is a groove-shaped range having two arcs to provide two contact points with the ball 13. The Gothic arch groove range 33 is formed within a 20-degree circumferential range, for example, of the direction changing path 21a. As shown by a cross-section taken along a line F-F, a curvature radius $R_a$ of the two arcs is larger than the radius of the ball 13. The shape of the Gothic arch groove is bilaterally symmetrical with respect to a center line, and a center pitch and center positions of the two curves having the curvature radius $R_a$ are decided so that a contact angle, which will be described later, will be 45°, for example. A bottom of the groove is rounded so as to have a curvature radius $R_b$.

The scoop section 22 is provided at a lower end portion of the Gothic arch groove range 33. An imaginary cross-section taken along a line L-L shows the shape of the scoop section 22 as viewed from the traveling direction of the ball 13. The tip of the scoop section 22 also has a shape of a Gothic arch groove having two arcs so that two contacts can be ensured with the ball. The curvature radius $R_a$ of the two arcs is equal to the curvature radius $R_a$ of the two arcs of the Gothic arch groove range 33. As will be described later, in a cross-section along the traveling direction of the balls 13, an arc surface $R_d$ is formed at a contact starting position between the ball 13 and the scoop section 22 (refer to FIG. 8). Therefore, at the tip of the scoop section 22, the center pitch of the two curves having the curvature radius $R_a$ become narrower than the center pitch of the Gothic arch groove range 33. As a result, the center positions of the two curves having the curvature radius $R_a$ are positioned outward of the center positions of the Gothic arch groove range 33 in the radial direction of the direction changing path 21a. By forming the arc surface $R_d$ at the contact starting position, the contact angle at the tip of the scoop section 22 also becomes smaller than the contact angle of the Gothic arch groove range 33 (refer to (B) of FIG. 9). In the present embodiment, the contact angle is reduced from 45°, for example, to 41°, for example. The shape of the groove of the scoop section 22 continuously changes from the shape of the F-F cross-section to the shape of the L-L imaginary cross-section within a transition range 34 of the scoop section.

It will be appreciated that no circular arc groove may be formed in the direction changing path 21a, and instead the Gothic arch groove may be provided throughout the direction changing path 21a.

Figure 5:
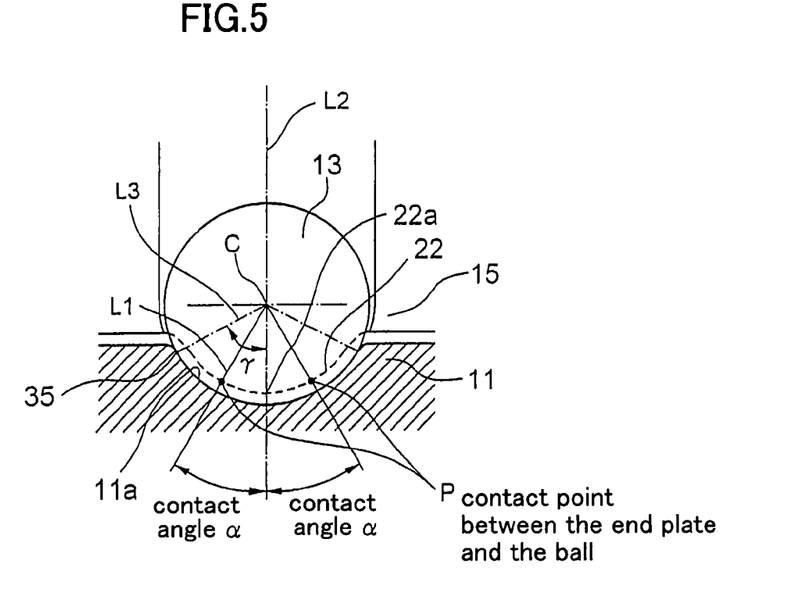
FIG. 5 illustrates definition of a contact angle.

FIG. 5 illustrates a definition of a contact angle α. In a cross-section perpendicular to the traveling direction of the balls 13, a contact angle is defined to be an angle α made between a Line L1 connecting a point P where the scoop section 22 contacts the ball 13 to a center C of the ball 13 and a line L2 connecting the center C of the ball 13 to a bottom 22a of the Gothic arch groove-shaped scoop section 22. In the present invention, the contact angle α at the scoop section 22 in the Gothic arch groove range 33 is set to be more than 30° and to be equal to or less than an angle γ made between a line L3 connecting the center C of the ball that rolls in the ball rolling groove 11a of the raceway rail 11 to an edge 35 of the ball rolling groove 11a of the raceway rail 11 and the line L2 connecting the center C of the ball 13 to a bottom of the ball rolling groove 11a of the raceway rail 11. In this case, the contact angle is preferably equal to or more than 40° and equal to or less than 60°. In the present embodiment, the contact angle is set at 45° as shown in FIG. 4

Figure 6:
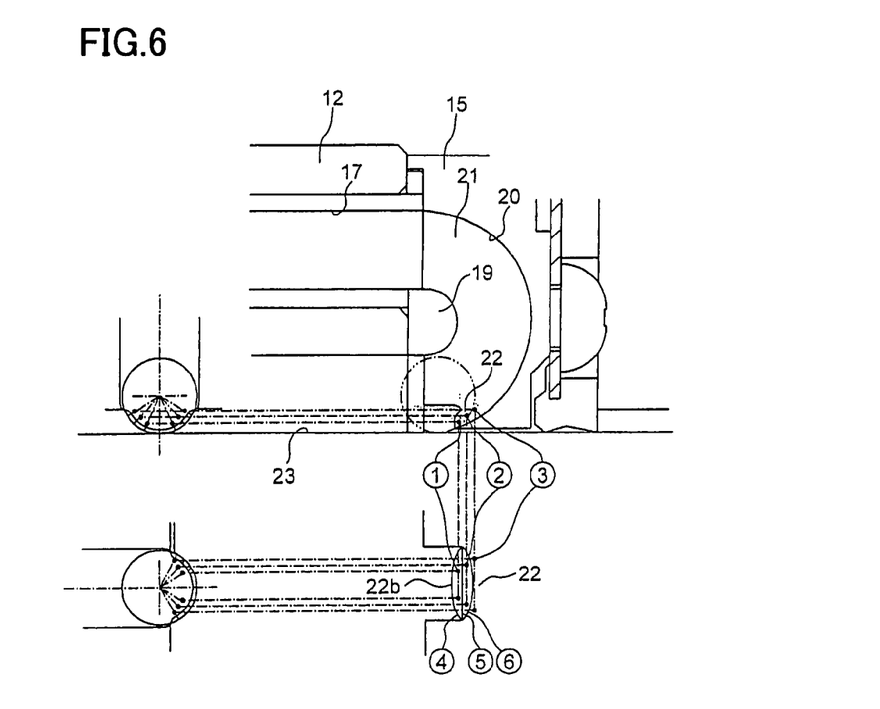
FIG. 6 illustrates a relationship between the contact angle and a contact starting position.

FIG. 6 illustrates a relationship between the contact angle α and the contact starting position (a position where the ball 13 starts contacting the scoop section 22 when the scoop section 22 scoops the ball 13 that rolls in the ball rolling groove 11a of the raceway 11). As shown in Table 1, as the contact angle α is changed as 30°→45°→60°, the contact starting position also changes as (1)→(2)→(3) indicated in FIG. 6.

TABLE 1

| | Contact angle | | |
|---|---|---|---|
| | 30° | 45° | 60° |
| Contact starting position between the ball and the end plate | ① | ② | ③ |
| Shape of a lip front edge | ④ | ⑤ | ⑥ |

As can be seen from FIG. 6, the larger contact angle α allows the contact starting position to step back in the traveling direction of the balls 13 as indicated by (1)(2) and (3) and to be transferred to an upper position. Thus, the thickness of the scoop section 22 of the ball 13 is increased, enhancing the strength and enabling to cope with high-speed movement. As indicated by (4)→(5)→(6) in FIG. 6, since a front edge 22b of the scoop section 22 can be stepped back (since the larger contact angle α makes it difficult for the front edge 22b of the scoop section 22 to be in contact with the ball, the front edge 22b can be stepped back), the scoop section 22 can be shortened so as to mitigate damages that may be caused at the scoop section 22 in high-speed movement.

An upper limit of the contact angle α is determined so that the scoop section 22 is placed within the inside of the edge 35 of the ball rolling groove 11a. In this way, the ball 13 can be scooped up even when the ball rolling groove 11a is deep.

Figure 7:
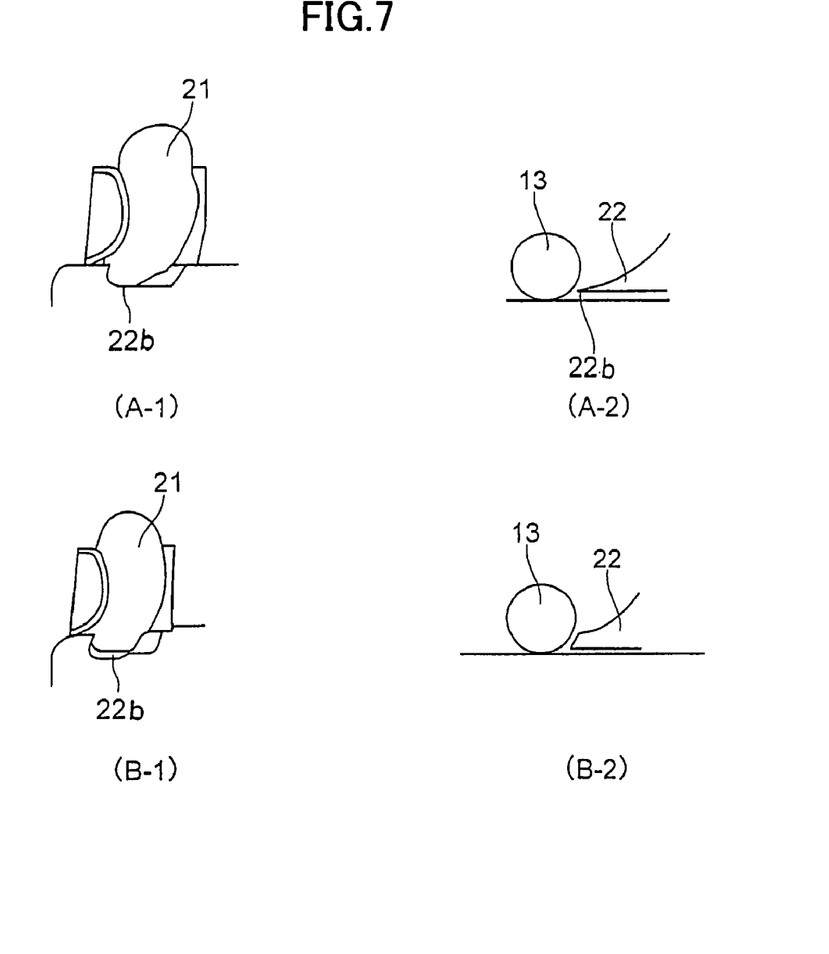
FIG. 7 illustrates a concept of a design of a scoop section (each of (A-1) and (B-1) perspectively illustrating a direction changing path as viewed from the side of a moving block body, and each of (A-2) and (B-2) illustrating a cross-section of the scoop section along a traveling direction of balls)
Figure 8:
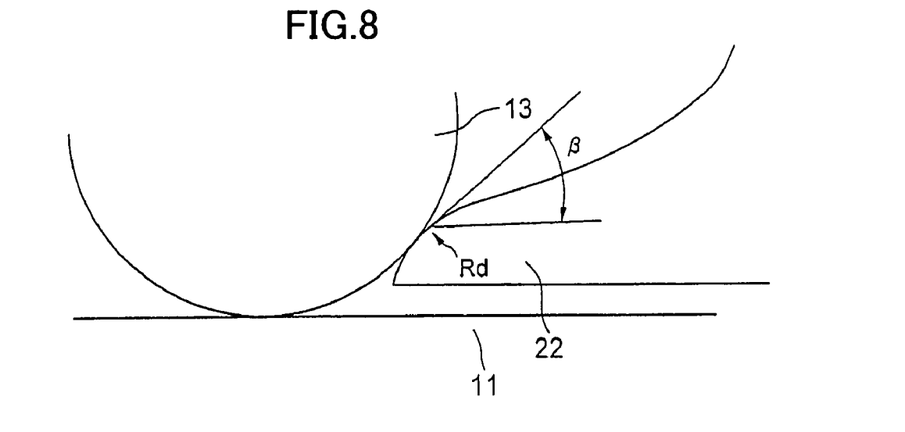
FIG. 8 illustrates a cross-section of the scoop section along the traveling direction of the balls.

FIGS. 7 and 8 each illustrate a concept of the scoop section 22. In FIG. 7, each of (A-1) and (B-1) perspectively illustrates the direction changing path 21 as viewed from the moving block body, and each of (A-2) and (B-2) illustrates a cross-section of the scoop section 22 along the traveling direction of the ball 13. As indicated by (A-1) and (A-2), when the front edge 22b is projected, the ball 13 may collide against the front edge 22b of the scoop section 22 causing potential damages to the scoop section 22. When the contact angle α is increased as in the present embodiment, the front edge 22b of the scoop section 22 can be stepped back in the traveling direction of the ball 13 as described above, so that the front edge 22b of the scoop section 22 can be formed into a shape as if the front edge 22b has been cut off. In this way, the strength of the scoop section 22 can be enhanced, whereby the scoop section 22 can be prevented from suffering from damages.

FIG. 8 illustrates a cross-sectional shape (cross-sectional shape at a plane including one of two contact points between the ball 13 and the scoop section 22) of the scoop section 22 along the traveling direction of the balls 13. Merely cutting the tip of the scoop section 22 will make a scoop angle β larger when scooping the ball 13. This will inevitably increase the force of bending or compressing the scoop section 22 by the balls 13. In order to let go the force and to make the scoop angle β gentle, chamfering is performed to provide an arc surface of a radius $R_d$ at the contact starting position.

Figure 9:
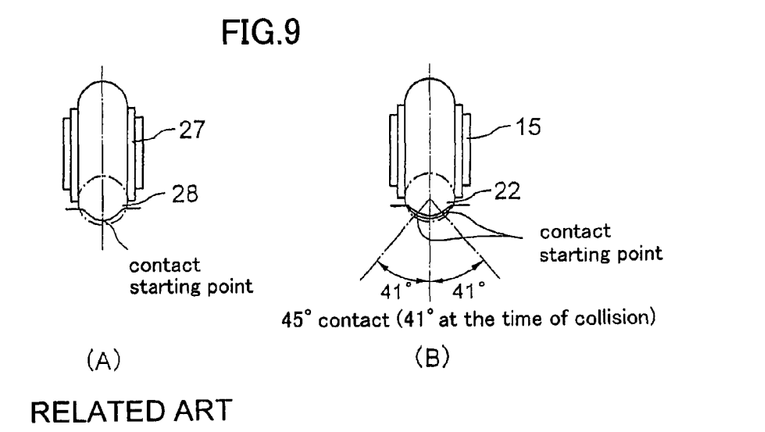
FIG. 9 illustrates, for comparison, states of contact between the ball and the scoop section, at a tip of the scoop section ((A) representing the conventional end plate, and (B) representing the end plate according to the present embodiment)
Figure 10:
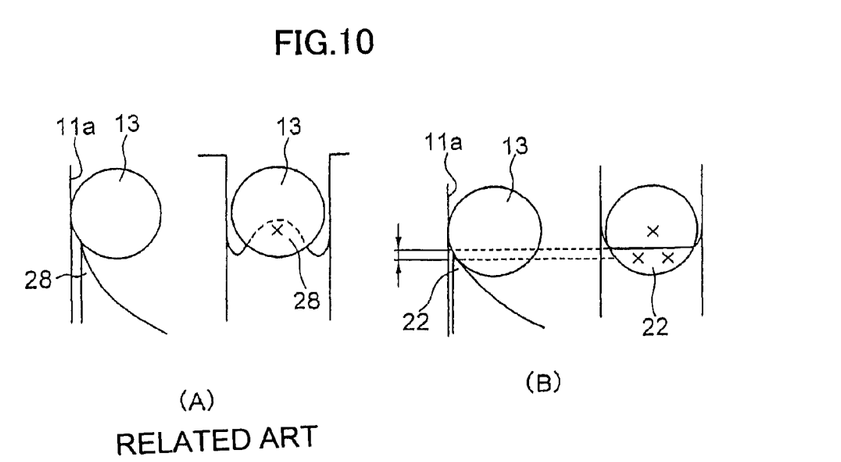
FIG. 10 illustrates the scoop section in detail ((A) representing a conventional scoop section, and (B) representing the scoop section according to the present embodiment)

Each of FIGS. 9 and 10 illustrates a state of contact between the ball 13 and the scoop section 22, at the tip of the scoop section 22, for comparison between the conventional scoop section 28 and the scoop section 22 of the present embodiment. FIG. 9 illustrates the end plates ((A) indicating the conventional end plate 27 and (B) indicating the end plate 15 according to the present embodiment). FIG. 10 illustrates the details of the scoop section 22 ((A) indicating the conventional scoop section 28 and (B) indicating the scoop section 22 according to the present embodiment). In the conventional end plate 27, the ball 13 contacts a tip of the scoop section 28 at the contact starting position through one point, and the ball 13 also contacts the ball rolling groove 11a through one point. Contrarily, in the present embodiment, the ball 13 contacts the scoop section 22 at the contact starting position through two points, and the ball 13 also contacts the ball rolling groove 11a through one point. Such a structure of three-point contact can also mitigate damages on the scoop section 22 in high-speed movement. It will be appreciated that, since the arc surface is formed at the contact starting position, the contact angle α of the scoop section 22 at the contact starting position becomes smaller than 45°, for example, 41°.

Figure 11:
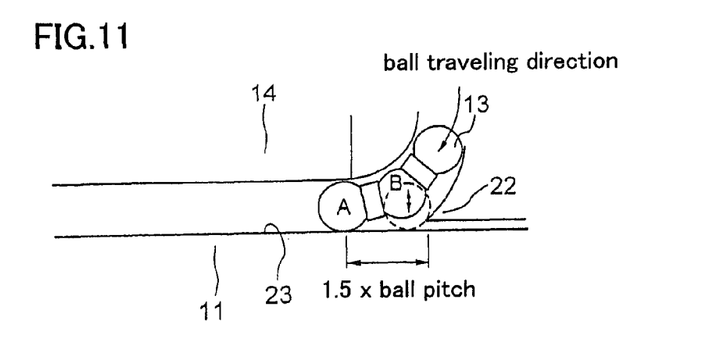
FIG. 11 illustrates an example of how to determine a distance from an end face of the moving block body to the scoop section.
Figure 12:
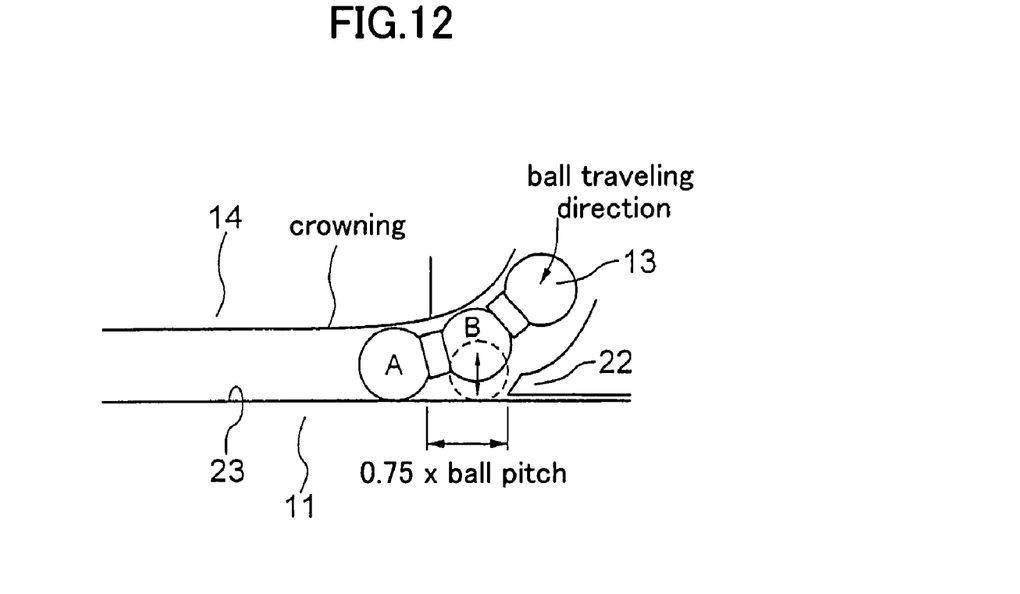
FIG. 12 illustrates an example of how to determine a distance from an end face of the moving block body to the scoop section.

Each of FIGS. 11 and 12 illustrates an example of how to determine a distance from the end face of the moving block body 14 to the scoop section 22. FIG. 11 illustrates how to determine a maximum value of the distance, and FIG. 12 illustrates how to determine a minimum value of the distance.

As shown in FIG. 11, when the ball 13 starts entering the load ball rolling path 23, a ball A is considered to suffer resistance. At this moment, a center of the ball A is positioned on the end face of the moving block body 14. The scoop section 22 is displaced backward, so that, even when a ball B pushing the ball A moves up and down and contacts the raceway rail, the scoop section 22 is not brought into contact with the ball 13. The maximum value of the distance from the end face of the moving block body 14 to the tip of the scoop section 22 results in about 1.5×ball pitch.

As shown in FIG. 12, the moving block body 14 is provided with crowning. When the ball A has entered the load ball rolling path 23, the ball A is considered to suffer resistance. At this moment, the end point of the ball A is positioned on the end face of the moving block body 14. The scoop section 22 is displaced backward, so that even when the ball B pushing the ball A moves up and down and contacts the raceway rail, the scoop section 22 is not brought into contact with the ball 13. The minimum value of the distance from the end face of the moving block body 14 to the tip of the scoop section 22 results in about 0.5×ball pitch.

Thus, the distance from the end face of the moving block body 14 to the tip of the scoop section 22 is determined to be from about 0.5 to about 1.5×ball pitch. Considering a scooping position of the scoop section, the distance from the end face of the moving block body 14 to the tip of the scoop section 22 is preferably determined to be from about 0.75 to about 1.25×ball pitch.

It will be appreciated that the present invention is not limited to the embodiment described above but may be modified in various ways within a scope of not changing the gist of the present invention. For example, the present invention may be applied not only to a linear guide but also to a ball spline.

The invention claimed is:

1. A motion guide device, comprising:
   a raceway member in which ball rolling grooves are formed;
   a moving member formed with load ball rolling grooves facing said ball rolling grooves and having no-load ball return paths each connecting a first end and a second end of each of said load ball rolling grooves, said moving member including a scoop section; and
   a plurality of balls which are arranged in load ball rolling paths each defined between said ball rolling groove of said raceway member and said load ball rolling groove of said moving member and in said no-load ball return paths,
   wherein said scoop section aids in scooping the balls rolling in said ball rolling grooves of said raceway member for introduction into said no-load ball return paths,
   wherein a tip of said scoop section has a cross-sectional shape formed into a shape of a Gothic arch groove for two-point contact with the ball,
   wherein in a cross-section perpendicular to a traveling direction of the balls, a contact angle made between a line connecting a point where said tip of said scoop section contacts the ball to a center of the ball and a line connecting the center of the ball to a bottom of the Gothic arch groove of said tip of said scoop section is more than 30°, and
   wherein said contact angle is equal to or less than an angle made between a line connecting the center of the ball that rolls in said ball rolling grooves of said raceway member to an edge of said ball rolling groove in said raceway member and the line connecting the center of the ball to a bottom of said ball rolling groove in said raceway member.

2. The motion guide device according to claim 1, wherein said contact angle is equal to or more than 40° and equal to or less than 60°.

3. The motion guide device according to claim 1 or 2, wherein in a cross-section along the traveling direction of the balls, an arc surface is formed at a contact starting position where the ball starts contacting said tip of said scoop section when said scoop section scoops the ball that rolls in said ball rolling groove of said raceway member.

4. The motion guide device according to claim 1 or 2,
   wherein said moving member comprises:
      a moving block body which is formed with said load ball rolling grooves and no-load return paths each extending parallel to each of said load ball rolling grooves with a predetermined interval therebetween; and
      end plates provided at both ends of said moving block body in its traveling direction, in each of which an outer periphery of a direction changing path connecting between said no-load return path and said load ball rolling path is formed for circulation of the balls, and
   wherein said scoop section is provided at said end plate.

5. The motion guide device according to claim 4,
   wherein said outer periphery of said direction changing path formed in said end plate is structured circumferentially by a groove-shaped circular arc groove range consisting of a single arc, a groove-shaped Gothic arch groove range having two arcs for providing two contact points with the ball, and a groove transition range provided between said circular arc groove range and said Gothic arch groove range to provide gradual change in the shape of the groove from the circular arc to the Gothic arch, and
   wherein said scoop section is provided at an end of said Gothic arch groove range.

* * * * *